L. W. STEWART.
CULTIVATOR ATTACHMENT.
APPLICATION FILED MAR. 7, 1910.
981,493.
Patented Jan. 10, 1911.
2 SHEETS—SHEET 1.
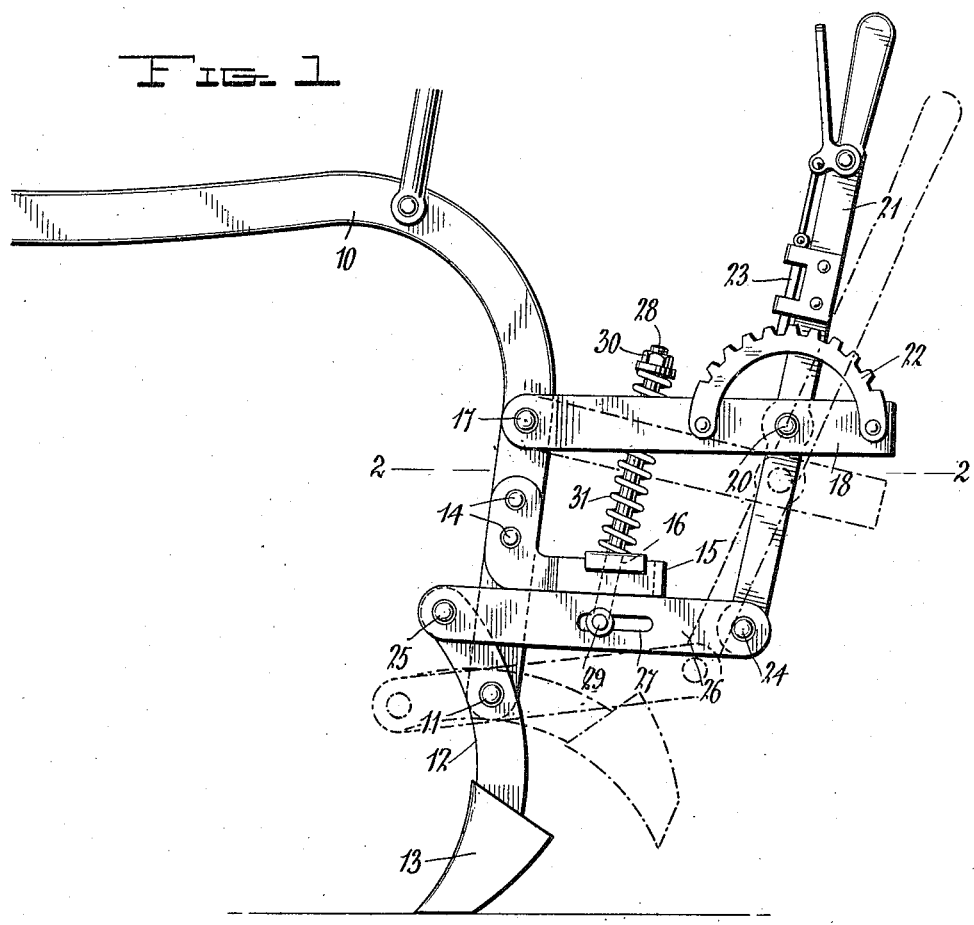
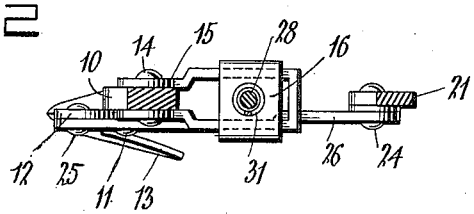
Witnesses
Inventor
Lon Woodson Stewart
By
Attorneys.

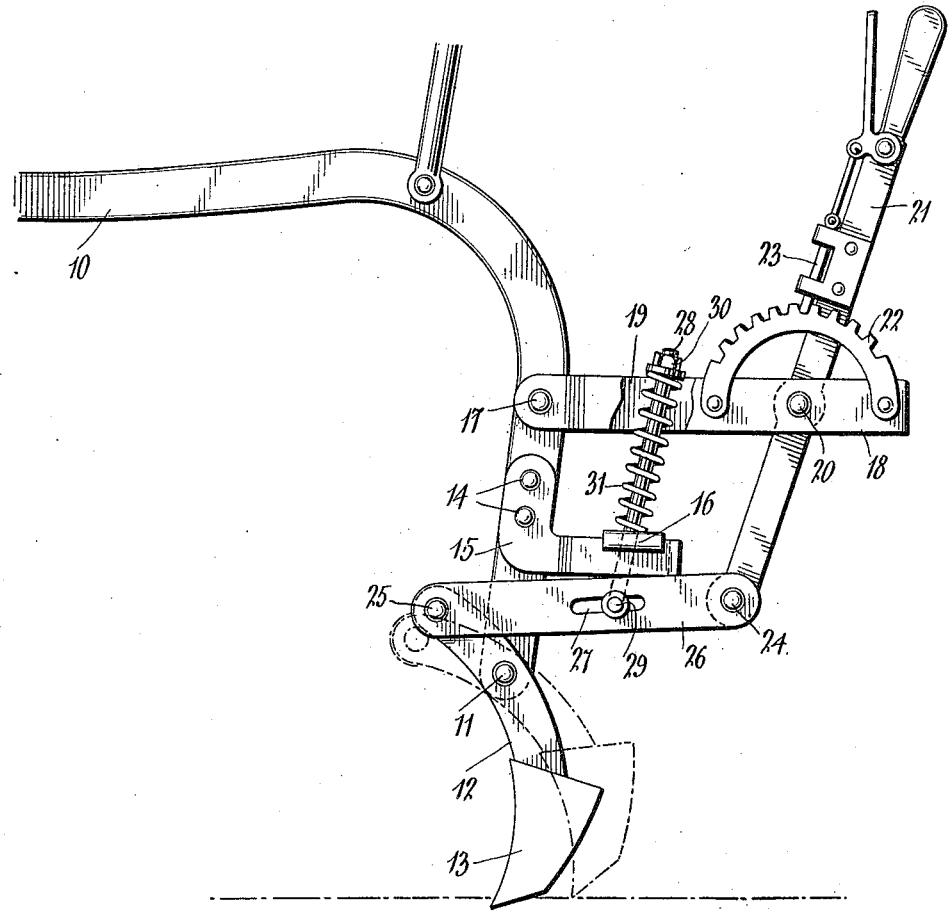

UNITED STATES PATENT OFFICE.

LON WOODSON STEWART, OF THORP SPRING, TEXAS.

CULTIVATOR ATTACHMENT.

981,493.    Specification of Letters Patent.    Patented Jan. 10, 1911.

Application filed March 7, 1910. Serial No. 547,710.

*To all whom it may concern:*

Be it known that I, LON WOODSON STEWART, a citizen of the United States, residing at Thorp Spring, in the county of Hood, State of Texas, have invented certain new and useful Improvements in Cultivator Attachments; and I do hereby declare the following to be a full, clear, and exact description of the invention, such as will enable others skilled in the art to which it appertains to make and use the same.

This invention relates to cultivators and similar implements, and has for one of its objects to provide an attachment to devices of this character whereby the cultivator hoe or shovel may be adjusted to dig into the ground any required distance beneath the surface, or to skim over the surface, as may be required, the adjustments being accomplished without stopping the forward movement of the cultivator.

Another object of the invention is to provide a simply constructed device whereby the shovel or hoe member will yield when encountering abnormal resistance and thus prevent the fracture of any of the parts.

With these and other objects in view, the invention consists in certain novel features of construction as hereinafter shown and described and then specifically pointed out in the claims; and, in the drawings illustrative of the preferred embodiment of the invention. Figure 1 is a side elevation of a portion of a conventional cultivator with the improvement applied and the plow or cultivator member in position for "skimming" over the surface of the soil. Fig. 2 is a plan view of the same, with the beam, operating lever, and relief spring in section on the line 2—2 of Fig. 1. Fig. 3 is a view similar to Fig. 1 showing the plow arranged to dig into the ground.

The improved device may be applied to many forms of cultivators, and it is not desired therefore to limit the invention to any specific construction of devices of this character.

For the purpose of illustration the improved device is shown applied to a conventional cultivator beam 10 having a downwardly directed rear portion. Pivoted at 11 to the downwardly directed portion of the beam is a standard member 12 having the cultivator hoe or plow 13 connected to its lower end.

Riveted or otherwise rigidly secured at 14 to the beam 10 above the pivotal point 11 of the standard is a bracket 15 having an apertured terminal 16, the bracket being extended rearwardly of the standard, as shown.

Pivoted at 17 to opposite sides of the beam 10 are two arms 18—19, and pivoted at 20 between the arms in an operating lever 21. Connected to the arm 18 is a toothed segment 22 with which a pawl device 23 carried by the lever engages, so that the lever and the arms may be maintained in any position to which they may be adjusted.

Pivoted at its ends at 24—25 to the lower end of the lever 21 and to the upper end of the standard 12, is a link bar 26, the latter being provided with a longitudinal slot 27. Extending through the apertured head 16 of the bracket is a bolt 28 having a pin 29 at its lower end engaging slidably in the slot 27. The bolt 28 is provided with an adjusting nut 30, and surrounding the bolt and bearing at its ends between the nut and the bracket is a spring 31. By this arrangement the force of the spring is exerted to maintain the link bar 26 yieldably in engagement with the bracket, while at the same time the link bar is movable longitudinally of the bracket within the range of the slot. By this arrangement the standard 12 may be set to locate the point of the hoe 13 at any desired point relative to the beam and to the surface of the ground. Thus if it is desired that the hoes shall dig relatively deep into the soil, which is required when cultivating some forms of plants, then the lever 21 is adjusted to move the upper end of the standard 12 forwardly and the lower end rearwardly to incline the point of the hoe to a greater extent, but if it is desired to cause the hoe to travel nearer the surface of the ground, or to skim over the surface, then the lever 21 is adjusted to move the upper end of the standard rearwardly, as will be obvious.

The spring 31 possesses sufficient strength to hold the link bar 26 and its attachments against any strains to which they will be subjected during the ordinary operations of the hoe 13. In event however of the hoes meeting with abnormal obstructions, as for instance grubs, stones, or the like, which would cause the fracture of the hoe or other parts, the spring 31 will yield and the standard 12 swinging upon its pivot 11 will permit the hoe to pass over the obstructions. This abnormal movement of the standard causes the arms 18—19 and their attachments to swing upon the pivot 17 and assume the position shown in dotted lines Fig. 1, which represents the position of the parts when the hoe is passing over obstructions, as above noted. By this simple means the inclination of the hoe may be readily adjusted to any required extent, to quickly adapt the device to the condition of the ground or the plants which are being cultivated.

Cultivators of the class described are usually provided with a plurality of beams 10, and each of the beams will be provided with its separate and independent hoe adjusting mechanism, as will be obvious, but these parts are not shown as they form no part of the present invention.

The lever 21 is within easy reach of the driver upon the seat of the cultivator, not shown, so that the adjustments can be accomplished without stopping the team. It frequently happens that it is desirable to change the position of the hoes at different points in the same row, and this can be readily accomplished by the driver by manipulating the levers 21 from his seat, and without stopping the team.

What is claimed is:—

1. The combination with a cultivator beam of a standard swinging from the beam and carrying a cultivator hoe, an arm swinging from said beam, an operating lever pivoted to said swinging arm, means for locking said lever to said swinging arm, a link bar connecting said lever and standard, and means for maintaining said link bar yieldably in its upper position.

2. The combination with a cultivator beam of a standard swinging from the beam and carrying a cultivator hoe, an arm swinging from said beam, an operating lever pivoted to said swinging arm, a link bar between said lever and standard, means for locking said lever to said swinging arm, a bracket connected to said beam, and a spring upon said bracket and operating to maintain said link bar yieldably in its upper position.

3. The combination with a cultivator beam of a standard swinging from the beam and carrying a cultivator hoe, an arm swinging from said beam, an operating lever pivoted to said swinging arm, means for locking said lever to said swinging arm, a link bar between said lever and standard and provided with a longitudinal slot, a bracket extending rearwardly of said beam, a bolt extending through said bracket and slidably engaging said link bar slot, and a spring surrounding said bolt and engaging said bracket and operating to maintain said link bar yieldably in its upper position.

4. The combination with a cultivator beam of a standard swinging from the beam and carrying a cultivator hoe, an arm swinging from said beam, an operating lever pivoted to said swinging arm, means for locking said lever to said swinging arm, a bracket extending rearwardly of said beam, a link pivoted at one end to said beam and bearing beneath said bracket and provided with a lateral pin at its free end, a spring engaging said bracket and operating to maintain said link yieldably in its upper position, and a link bar connected at its ends to said lever and standard and provided with a longitudinal slot slidably engaging over said pin.

In testimony whereof, I affix my signature, in presence of two witnesses.

LON WOODSON STEWART.

Witnesses:
  JNO. HINER,
  W. L. DEAN.